XR  4,057,448

United States P... TX350-96.21

Miller 4,057,448

Nov. 8, 1977

[54] OPTICAL FIBER SPLICING TECHNIQUE
[75] Inventor: Calvin Max Miller, Lilburn, Ga.
[73] Assignee: Bell Telephone Laboratories, Incorporated, Murray Hill, N.J.
[21] Appl. No.: 607,777
[22] Filed: Aug. 26, 1975

Related U.S. Application Data

[63] Continuation-in-part of Ser. No. 521,656, Nov. 7, 1974, Pat. No. 3,919,037.

[51] Int. Cl.² .......................................... B65H 69/06
[52] U.S. Cl. .................................. 156/158; 156/304; 156/502; 350/96 B
[58] Field of Search .................... 156/157–159, 156/161, 166, 293, 294, 296, 303.1, 304, 459, 460, 494, 502, 503, 507; 65/4, DIG. 7; 29/464, 466, 467, 468, 474.4, 203 J, 203 P; 350/96 B, 96 R; 138/DIG. 4, 118, 125, 126

[56] References Cited
U.S. PATENT DOCUMENTS

| | | | |
|---|---|---|---|
| 3,455,625 | 7/1969 | Brumley et al. | 350/96 |
| 3,607,576 | 9/1971 | Phillips | 156/157 |
| 3,734,594 | 5/1973 | Trambarulo | 350/96 R |
| 3,768,146 | 10/1973 | Braun et al. | 350/96 B |
| 3,798,099 | 3/1974 | Marcatili | 156/158 |
| 3,810,802 | 5/1974 | Buhite et al. | 156/296 |
| 3,861,781 | 1/1975 | Hasegawa et al. | 65/4 B |
| 3,864,018 | 2/1975 | Miller | 65/4 B |
| 3,871,935 | 3/1975 | Gloge et al. | 350/96 B |
| 3,912,574 | 10/1975 | Cherin et al. | 156/304 |
| 3,914,015 | 10/1975 | McCartney | 350/96 B |
| 3,928,102 | 12/1975 | Rowe et al. | 156/158 |

OTHER PUBLICATIONS

Modern Plastics Encyclopedia, 1959, vol. 36, No. 1, A pp. 546, 819.

Primary Examiner—Charles E. Van Horn
Assistant Examiner—John E. Kittle
Attorney, Agent, or Firm—Charles E. Graves

[57] ABSTRACT

Splicing of one or more pairs of mating optical fibers is facilitated by a loose-fitting optical fiber receiving tube having a uniform interior cross section with at least one corner; the corner forms a fiber-aligning groove substantially parallel to the longitudinal axis of the tube. Mating fibers, introduced into opposite ends of the tube, are bent at an angle with respect to the longitudinal axis sufficient to bias the fibers against the tube's interior surfaces. In response to forces generated by the bent fibers, the tube rotates to align itself until the mating fiber ends are lodged against the fiber-aligning groove. This procedure effects transverse alignment of the mating fibers, after which the fibers, still bent, are moved toward each other into abutment.

12 Claims, 11 Drawing Figures

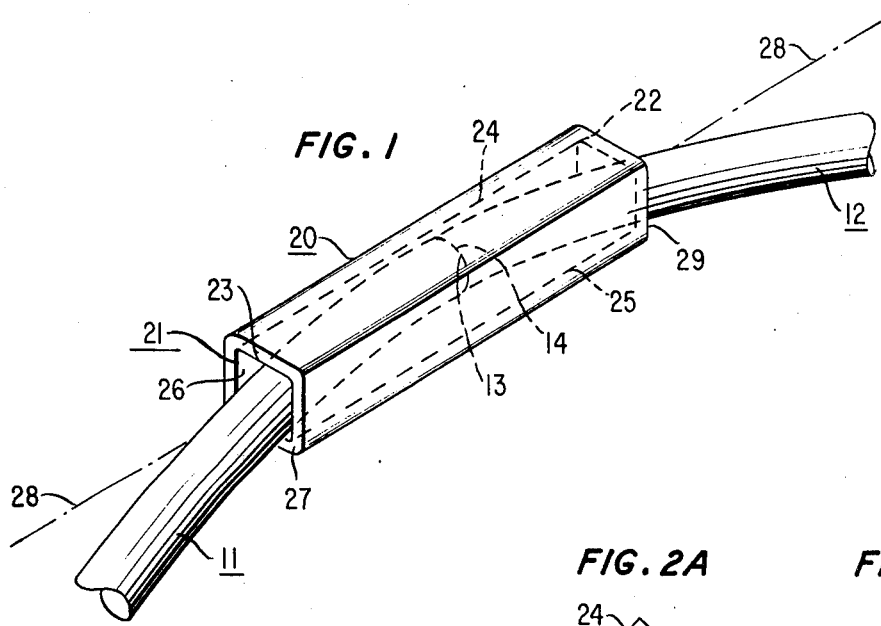
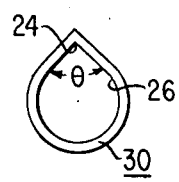
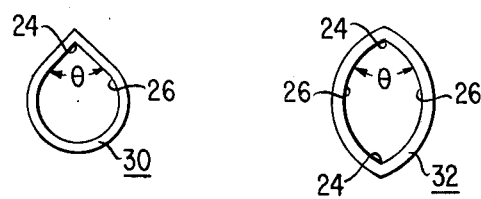
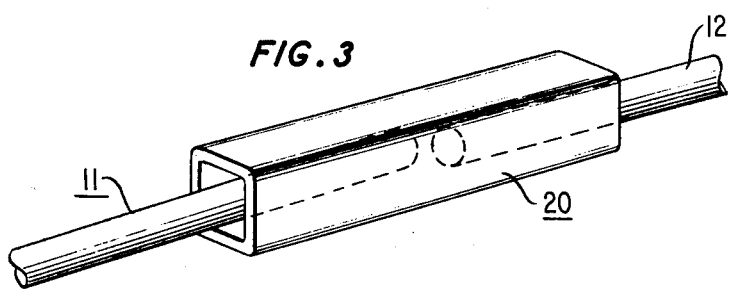
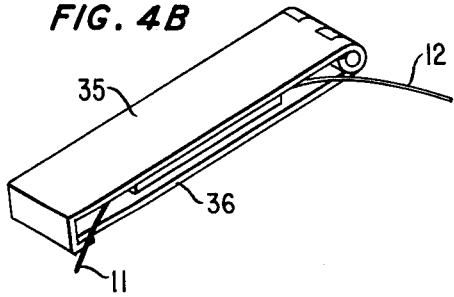
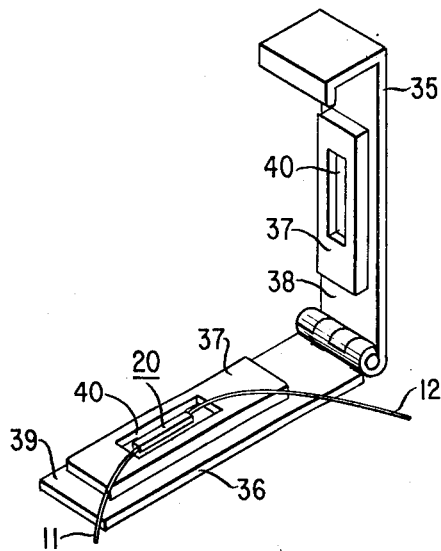

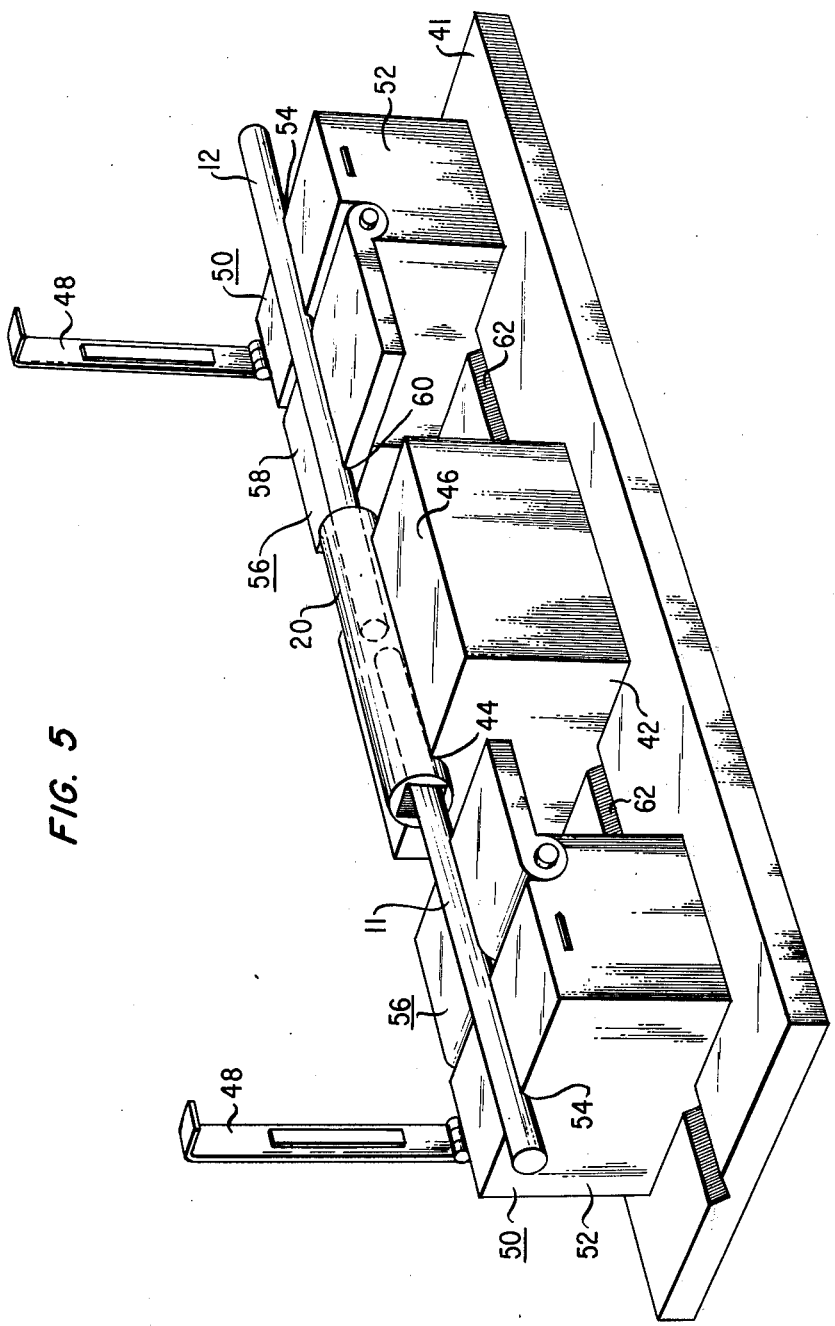

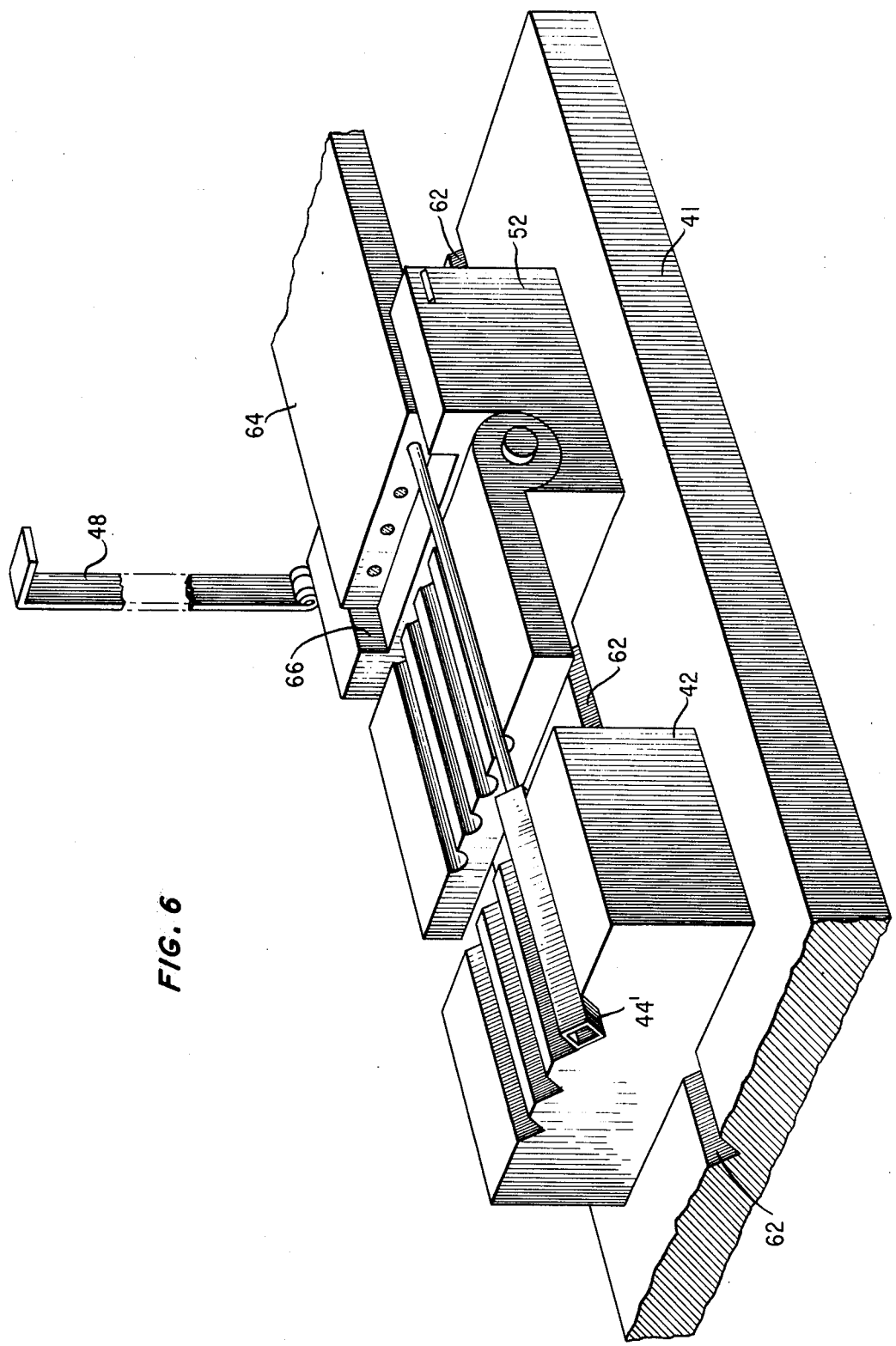

OPTICAL FIBER SPLICING TECHNIQUE

CROSS-REFERENCE TO RELATED APPLICATIONS

This is a continuation-in-part of application Ser. No. 521,656, filed Nov. 7, 1974 now U.S. Pat. No. 3,919,037. Another related application is Ser. No. 574,029, filed May 2, 1975 now abandoned.

BACKGROUND OF THE INVENTION

1. Field of the Invention

This invention relates to optical fibers, and more particularly, to apparatus and methods for splicing such fibers.

2. Description of the Prior Art

Success of future optical communications systems depends on the development of quick, convenient, and inexpensive means of splicing optical fibers. Splicing is difficult due to the small size of fibers and accurate transverse alignment needed for low-loss splices. To achieve a splice loss of 0.1dB, approximately a ±0.1 fiber core radius alignment accuracy is required.

One known method of transversely aligning two mating fibers is with a snug-fitting aligning sleeve. While such a sleeve is desirable for effecting simple and small splices, practical problems exist. To achieve the desired low-loss splice, the sleeve and mating fibers must be manufactured to very close tolerances. Also, there is difficulty in initially inserting fibers into such a sleeve. A third problem is that contamination is scraped off the interior surfaces of the sleeve and trapped between the fibers during fiber insertion.

It is therefore desirable to develop a transverse aligning technique which allows for simple and small splices, yet avoids the problems of a snug-fitting sleeve. It is also desirable that the aligning technique effect low-loss splices.

SUMMARY OF THE INVENTION

Pursuant to this invention, accurate transverse alignment of one or more pairs of mating optical fibers is facilitated by a loose-fitting optical fiber receiving tube having a longitudinally uniform interior cross section with at least one corner. The corner forms a fiber-aligning groove in the interior surfaces substantially parallel to the longitudinal axis of the tube, hence combining the aligning accuracy of grooves and the small completed splices of sleeves.

Mating fibers are introduced into opposite ends of the optical fiber receiving tube with no particular orientation with respect to the tube. The fibers are then bent at an angle with respect to the longitudinal axis of the tube to bias the fibers against the interior surfaces of the tube. The stiffness of the fibers generates forces against the tube; in response to these forces, the tube rotates to align itself with respect to the fibers until the mating fiber ends are lodged against the fiber-aligning groove. This procedure effects transverse alignment of the mating fibers, after which the fibers, still bent, are moved toward each other into abutment. The tube forms part of the completed joint.

The invention and its objects, features, and advantages will be readily discerned from a reading of the description to follow of illustrative embodiments.

BRIEF DESCRIPTION OF THE DRAWING

FIG. 1 is a schematic perspective view of an abutted joint made with an optical fiber receiving tube in accordance with the present invention;

FIGS. 2A and 2B are illustrations of various alternative configurations for the optical fiber receiving tube;

FIG. 3 is an illustration of two mating fibers inserted into the optical fiber receiving tube as taught by this invention;

FIGS. 4A and 4B are illustrations of a temporary splicing fixture;

FIG. 5 illustrates an apparatus for joining a mating pair of optical fibers in accordance with this invention;

FIG. 6 illustrates an apparatus for joining linear arrays of optical fibers;

DETAILED DESCRIPTION

Figure 7A:
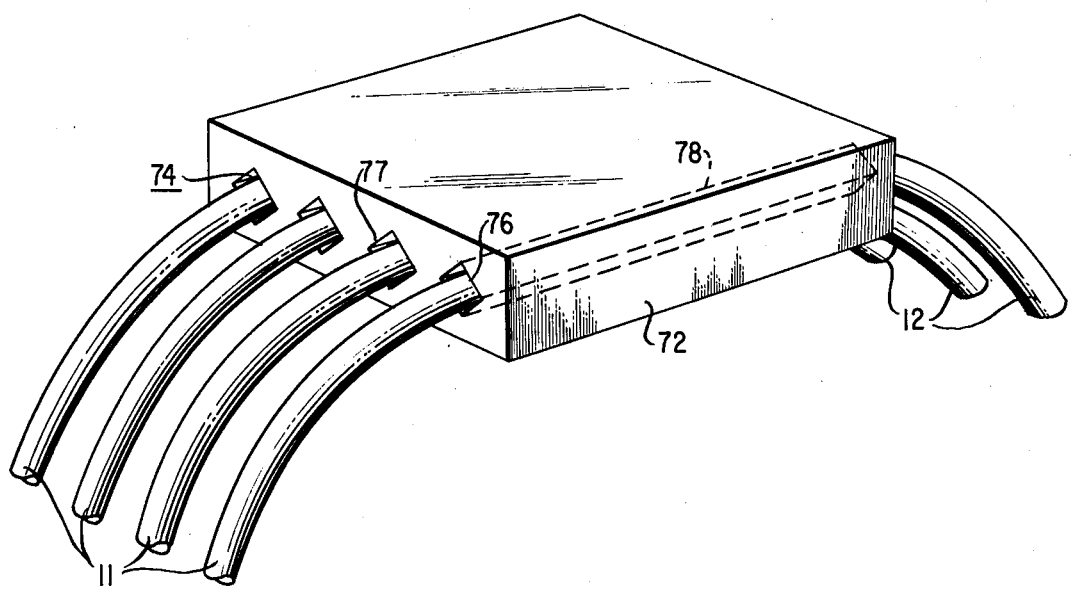
FIGS. 7A and 7B are illustrations of optical fiber receiving structures as taught by this invention.

Illustrated in FIG. 1 is an optical fiber receiving tube 20, adapted for joining two mating optical fibers 11 and 12. Tube 20, which is a hollow elongated member, has a uniform interior cross section 21 that is larger than the diameter of fibers 11 and 12 to loosely receive either fiber, 11 or 12, at any point along interior cross section 21, hence permitting easy insertion of the fibers and forming a loose fit. The interior cross section 21 and tube 20 are preferably selected so that tube 20 is sufficiently small to retain the benefits of a small splice of which tube 20 forms a part, while allowing easy insertion. For example, where the interior cross section 21 of tube 20 is square-shaped as shown in FIG. 1, the interior side edge 23 is preferably 10 to 70 percent greater in length than the diameter of fibers 11 and 12. The upper limit is chosen so that the fibers cannot accidentally pass each other in tube 20 during fiber insertion.

In accordance with this invention, interior cross section 21 comprises at least one corner 22, defined by two interior surfaces 26 disposed at an angle, depicted by $\theta$ with respect to each other, to form a fiber-alinging groove 24 in the interior surfaces 26 of tube 20 substantially parallel to the tube's longitudinal axis, which is depicted by line 28. Corner 22 constitutes a region of torsional equilibrium for tube 20 when interior surfaces 26 are impinged by fibers 11 and 12, inserted into opposite ends 27 and 29 of tube 20, respectively, and bent with respect to axis 28.

Also illustrated in FIG. 1 is the completed joint comprising optical fibers 11 and 12, transversely aligned and a butted in tube 20. Bent fibers 11 and 12 are positioned in a stable state as their fiber ends, 13 and 14 respectively, are lodged against fiber-aligning groove 24. Groove 24 preferably has an angle $\theta$ of approximately 90° to maintain the tranversely aligned fibers in a stable state. A greater angled groove would provide less stability in holding fiber ends 13 and 14 in place. Also, as the angle $\theta$ of groove 24 decreases from 90°, fiber insertion becomes more difficult due to flattening of the interior cross section. An angle $\theta$ from 60° to 150° is preferred.

In the preferred embodiment, tube 20 has a square cross-sectional configuration comprising four corners, each of which would suffice as a fiber aligning groove 24. Advantageously, the angle $\theta$ of each groove 24 is 90°. Insertion is relatively easy since all the sides are substantially of an identical dimension.

Furthermore, upon transverse alignment, fiber ends 13 and 14 are lodged against a first fiber-aligning groove 24, while the fibers, 11 and 12, further along their length, are biased against the diagonally opposite second fiber-aligning groove 25 near the ends 27 and 29 of tube 20 for more stability. The second groove 25 advantageously assures continual alignment of bent fibers 11 and 12 as they are moved into abutment.

Other cross-sectional configurations can be readily envisioned. A tube 30 having a uniform interior cross section with one corner, such as illustrated in FIG. 2A, may be utilized. FIG. 2B illustrates a two-cornered tube 32. Preferably, the two corners are diagonally opposite to each other for greater stability of the aligned fibers as permitted in a square-shaped tube. Cross-sectional configurations having more than four-fiber aligning grooves are possible; however, the angles of the grooves would increase and hence provide less table positioning of the fibers as mentioned earlier.

Optical fiber receiving tube 20 is capable of rotating about its longitudinal axis 28 in response to forces generated when mating fibers 11 and 12 are bent against the tube's interior surfaces 26. Advantageously, tube 20 is thin-walled to minimize the forces necessary to rotate tube 20 and to effect a smaller completed splice. Also, the interior surfaces 26 are advantageously smooth to allow easy movement of tube 20 with respect to fibers 11 and 12.

In one embodiment of the invention, tube 20 is advantageously made of glass. It is sometimes preferred that the glass be transparent for easy visual detection of the completed joint. Tubes made of plastic are also considered quite suitable.

To make an aligned joint, mating optical fibers 11 and 12 are introduced into opposite ends 27 and 29 of tube 20 with no particular orientation with respect to tube 20 as illustrated in FIG. 3. The fiber ends, 13 and 14, are advantageously flat, though they need not be optically polished. Fibers 11 and 12 are inserted preferably until they are substantially adjacent; their separation prevents any physical contact between the fiber ends which might thwart their movement during the alignment process described.

Inserted fibers 11 and 12 are then bent at an angle with respect to longitudinal axis 28 to bias fibers 11 and 12 against the interior surfaces of tube 20. The amount of bending desired depends on the size of tube 20 and fiber stiffness. Fibers 11 and 12 should be biased sufficiently against the interior surfaces 26 to generate the required rotational forces upon tube 20. In response to these forces, tube 20 rotates until fiber ends 13 and 14 are lodged against fiber-aligning groove 24 as shown in FIG. 1, thereby effecting transverse alignment of the fiber ends. After alignment, fibers 11 and 12, still bent, are moved toward each other into abutment. The bending of fibers 11 and 12 is exaggerated in FIG. 1 to more clearly visualize the invention. Also, the dimensions of the tube are not accurate. In the actual inventive technique, the tube length is substantially longer relative to the interior cross section than depicted and the fibers are stiffer.

The length of tube 20 is not so short with respect to the interior cross section 21 so that the longitudinal axes of the fibers are substantially skewed with respect to each other, even though the fibers are transversely aligned. Yet the tube length is short enough relative to interior cross section 21 to allow the bending needed in generating rotational forces for tube 20.

Upon transverse alignment, it is desirable that the longitudinal axes of mated fibers 11 and 12 be within one degree of each other on a common longitudinal axis. To assure that the longitudinal axes of fibers 11 and 12 are not more than 1° off, a tube length 0.5 inch has been suitably used for a square-shaped tube with an interior side edge 23 of 0.006 inch.

To permanently complete the splice, an index-matching fluid, such as curable epoxy, may be applied and allowed to cure in and around the abutted joint. Sometimes, it is advantageous that the index matching fluid be applied into tube 20 prior to fiber insertion; the fluid can then serve to wash away contamination on the fiber ends 13 and 14 during fiber insertion.

Where a temporary splice is desired, a thermoplastic material, such as polymethylmethacrylate, can be used to hold the abutted fibers in place. To terminate the joint, the material is then heated, hence allowing the fibers to separate.

Another approach for completing a temporary splice is to place the abutted joint in a fixture such as illustrated in FIG. 4A. The fixture comprises a top and bottom clamp, 35 and 36 respectively, adapted to be fastened together. The clamping surfaces 38 and 39 are lined with thick, soft layers 37 of a material such as ethylene-vinyl acetate copolymer (EVA). The soft layer 37 on each clamp has a recessed space 40 for placement of tube 20, such that the joint is suspended in air when the clamps are fastened together. The fastened clamps hold the abutted joint by maintaining the bent fiber configuration as shown in FIG. 4B.

Illustrated in FIG. 5 is an apparatus for joining a mating pair of optical fibers. Mounted on an assembly baseplate 41 is a positioning block 42 having a tube-positioning furrow 44 across its top surface 46 for placement of optical fiber receiving tube 20. Near either end of furrow 44 is an optical fiber guide assembly 50. Each fiber guide assembly 50 comprises a guiding block 52 having a fiber guiding channel 54 in axial alignment with furrow 44.

Pivotally mounted on each guiding block 52 is a fiber guiding plate 56 located adjacent to positioning block 42. The top surface 58 of plate 56 also has a fiber guiding channel 60 which is an axial alignment with channel 54 and furrow 44 during initial insertion of fibers 11 and 12 into tube 20.

The guiding channels 54 and 60 of each assembly 50 direct the insertion of respective fibers 11 and 12, into the opposite ends of tube 20, after which the fibers, 11 and 12, are held with a clamp 48 respectively, to each guiding block 52. The clamps 48 are advantageously lined with a material such as EVA.

Each plate 56 rotates about an axis substantially perpendicular to the longitudinal axis of the furrow 44 and is preferably pivotal in an upward direction. As both inserted fibers 11 and 12 are bent relative to tube 20 by pivoting plates 56 upwards, tube 20 is lifted from positioning block 42 and allowed to freely rotate in response to the forces generated by the bent fibers against the interior surfaces 26 until fiber ends 13 and 14 are lodged against a fiber-aligning groove 24. The plates 56 may be pivoted with any known conventional means.

In an alternative embodiment, positioning block 42 can be lowered after fiber insertion wherein guiding plates 56 can be rotated in a lateral direction to effect fiber bending and rotation of tube 20.

It is recognized that furrow 44 can be made very shallow and tube 20 be made cylindrical externally so as to allow rotation of tube 20 while tube 20 is still in contact with furrow 44.

Each guiding block 52 is slidably mounted on assembly baseplate 41 through a male-female interlocking guide track 62. The guide tracks 62 allow movement of guiding blocks 52 in a direction parallel to the longitudinal axis of furrow 44 so as to advance the transversely aligned fibers 11 and 12 into abutment. The splice is then completed with epoxy or a holding fixture as desired.

Figure 8:
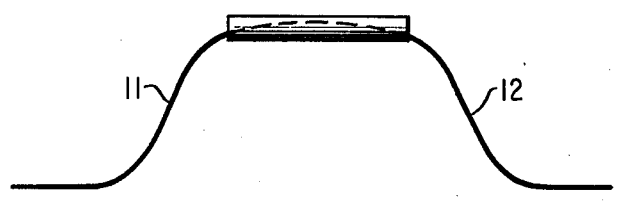
FIG. 8 depicts the bell-shaped configuration for a mating pair of fibers.

Advantageously, when a splice is made with epoxy, the apparatus maintains a bell-shaped curve as shown in FIG. 8 for the abutted fibers; such a bend generates sufficient forces to prevent fibers 11 and 12 from separating during curing of the epoxy.

This apparatus as illustrated in FIG. 5 can easily be modified to join two mating groups of fibers such as linear arrays 64 in the form of ribbons.

Advantageously, the fibers 11 or 12 of each ribbon 64 are substantially parallel to each other along their longitudinal axes and have a specific center-to-center spacing. The embedding materials of the ribbon structures are stripped away to prepare the fibers 11 and 12 for splicing. As illustrated in FIG. 6, the top surface 46 of positioning block 42 then comprises a plurality of furrows 44', for placement of a plurality of optical fiber receiving tubes 20. The furrows 44' are parallel to each other and have substantially the same center-to-center spacing as the arrayed fibers 11 and 12. Each guiding block 52, of which only one is illustrated, can be adapted to position an optic ribbon structure as shown by ribbon guide 66. The alignment abutment process is similar to that for single mating fibers.

As the number of fibers being joined simultaneously increases, it is sometimes advantageous to align the grooves of the tubes in a specific orientation with respect to the bending. For example with joining apparatus shown in FIG. 6, a plurality of square-shaped tubes also correspondingly square-shaped externally in configuration can advantageously be positioned in V-shaped furrows 44' on the top surface of positioning block 46. This minimizes the amount of rotation needed by tubes 20 to align the fibers as the grooves are initially oriented for the movement of fiber ends 13 and 14 towards them.

In another embodiment, an optical fiber receiving structure 72 comprising a plurality of parallel tube-like cavities 74 as depicted in FIG. 7A, may be utilized to join linear arrays 64 of optical fibers. No tube-holding fixtures are needed in this embodiment. Each cavity 74, continuous with respect to either end, is adapted to receive and align the respective mating fibers 11 and 12. Having interior dimensions similar to that of tube 20, each cavity 74 has a uniform cross section 76 for loosely fitting the inserted fibers. The cross section 76 of each cavity comprises at least one corner 77 which forms a fiber-aligning groove 78 substantially parallel to the cavity's longitudinal axis. Advantageously the fiber-aligning grooves 78 of the cavities 74 are oriented with respect to each other and the direction of bending such that when the mating arrays 64 are bent to bias the fibers against the cavity walls, the fiber ends are simultaneously directed toward the respective fiber-aligning grooves 78.

Figure 7B:
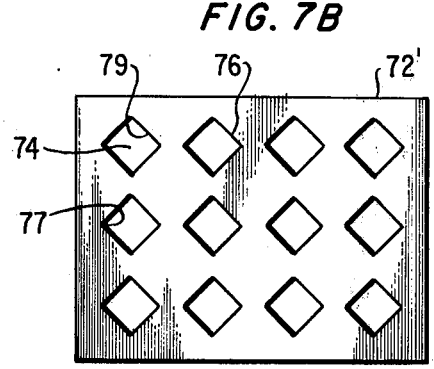

To achieve the splice, the arrayed fibers are first inserted into the opposite ends of the corresponding cavities 74 with no particular orientation to the cavities 74. The arrays are then bent with respect to the longitudinal axes of cavities 74 to urge the plurality of fiber ends 13 and 14 against the respective cavity walls 79 and towards the corresponding grooves 78. The bending generates sufficient fiber biasing forces to cause fibers 11 and 12 to move along the respective cavity walls 79 until the plurality of fiber ends 13 and 14 lodged in their respective grooves 78. Structure 72 forms a part of completed joint. The structure 72 may be extended to splice a plurality of linear arrays 64 as depicted in FIG. 7B in a cross-sectional view.

It is to be understood that the embodiments described herein are merely illustrative of the principles of the invention. Various modifications may be made thereto by persons skilled in the art without departing from the spirit and scope of the invention.

What is claimed is:

1. A method of joining the mating ends of a pair of optical fibers comprising the steps of:

inserting said fibers into opposite ends of a loose-fitting optical fiber receiving tube being capable of rotating about its longitudinal axis and having a uniform interior cross section comprising at least one corner, said corner forming a fiber-aligning groove in the interior surfaces of said tube substantially parallel to said longitudinal axis;

bending said fibers with respect to said longitudinal axis to bias said fibers against said interior surfaces, said biasing generating sufficient forces to rotate said tube until said mating fiber ends are lodged against said fiber-aligning groove to effect transverse alignment of said fibers;

advancing said bent fibers into abutment with each other; and joining said fibers while they are held in the bent and abutting position.

2. The method according to claim 1 including the step of placing index-matching fluid in said tube prior to the advancing step.

3. The method according to claim 1 wherein said tube has a substantially square interior cross section.

4. The method according to claim 1 wherein in said inserting step, said fibers are inserted until said fiber mating ends are substantially adjacent.

5. The method according to claim 1 wherein said tube is transparent.

6. The method according to claim 2 wherein said index-matching fluid is a material which hardens after said advancing step to join said abutted fibers while said fibers are held in the bent and abutting position.

7. The method according to claim 6 further comprising: bending said fibers into a bell-shaped curve.

8. The method according to claim 3 wherein said interior side edge has a dimension 10 to 70 percent greater than the diameter of said fibers.

9. A method of joining the mating ends of a first linear array of optical fibers to the corresponding ends of a second linear array of optical fibers, said fibers of each array being substantially parallel to each other along their longitudinal axes, said method comprising the steps of:

inserting the fibers of said arrays into respective opposite ends of plurality of loose-fitting optical fiber receiving tubes, said tubes having substantially the same center-to-center spacing as said fibers of each array and being contained in a first plane, each said tube being capable of rotating about its longitudinal axis and having a uniform interior cross section comprising at least one corner, said corner forming a fiber-aligning groove in the interior surfaces of said corresponding tube, said groove being substantially parallel to said corresponding tube's longitudinal axis;

bending said linear arrays with respect to the longitudinal axes of said tubes to bias said fibers against the interior surfaces of each said corresponding tube, said biasing generating sufficient forces to rotate said tubes until said mating fiber ends of said respective optical fibers are lodged against the corresponding fiber-aligning grooves to effect transverse alignment of said respective mating fibers;

advancing the bent fibers of said arrays into abutment with each other; and joining said corresponding fibers while they are held in the bent abutting position.

10. The method according to claim 9 wherein said fiber aligning grooves are oriented with respect to each other and to said bending in such a way that bending said array moves said fiber ends of each array in a direction toward said grooves.

11. Apparatus for joining a mating pair of optical fibers comprising: a loose-fitting optical fiber receiving tube capable of rotating in response to forces generated when said fibers are biased against the interior surfaces of said tube, said tube comprising:

a uniform interior cross section comprising at least one corner, said corner forming a fiber-aligning groove in the interior surfaces substantially parallel to the longitudinal axis of said tube;

means for inserting said fibers until they are a small distance apart;

means for bending said fibers with respect to said longitudinal axis to bias them against the interior surfaces of said tube, said biasing causing rotation of said tube to effect transverse alignment by lodging said fiber ends against said fiber-aligning groove;

means for abutting said bent fibers; and means for joining said fibers while they are held in the bent and abutting position.

12. Apparatus for joining the mating ends of a first linear array of optical fibers to respective ones of a second linear array comprising:

a plurality of loose-fitting optical fiber receiving tubes capable of rotating about their respective longitudinal axes, said tubes having substantially the same center-to-center spacing as said arrayed fibers, each said tube having a uniform interior cross section comprising at least one corner, said corner forming a fiber-aligning groove in the interior surfaces of said tube substantially parallel to the tube's longitudinal axis;

means for holding said tubes in a first plane;

means for introducing said fibers of each array into the opposite ends of the respective tubes;

means for bending said fibers with respect to the longitudinal axes of said tubes to bias said fibers against the interior surfaces of the respective tubes, said biasing causing rotation of said tubes to effect transverse alignment by lodging said fiber ends against said fiber-aligning grooves;

means for advancing said bent fibers into abutment; and means for joining said corresponding fibers while they are held in the bent and abutting position.

* * * * *

UNITED STATES PATENT AND TRADEMARK OFFICE
CERTIFICATE OF CORRECTION

PATENT NO. : 4,057,448

DATED : November 8, 1977

INVENTOR(S) : Calvin M. Miller

It is certified that error appears in the above-identified patent and that said Letters Patent are hereby corrected as shown below:

Column 2, line 44, "θwith" should read --θ,with--.
Column 2, line 54, "a butted" should read --abutted--.
Column 3, line 20, "table" should read --stable--.
Column 4, line 46, "an" should read --in--.

Signed and Sealed this

Eighteenth Day of April 1978

[SEAL]

Attest:

RUTH C. MASON
Attesting Officer

LUTRELLE F. PARKER
Acting Commissioner of Patents and Trademarks